US012044446B2

(12) United States Patent
Sagata et al.

(10) Patent No.: US 12,044,446 B2
(45) Date of Patent: Jul. 23, 2024

(54) ABSORPTION CHILLER

(71) Applicant: YAZAKI ENERGY SYSTEM CORPORATION, Tokyo (JP)

(72) Inventors: Teruhiro Sagata, Hamamatsu (JP); Hiroshi Uematsu, Hamamatsu (JP); Osamu Hiyama, Hamamatsu (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 0 days.

(21) Appl. No.: 17/876,387

(22) Filed: Jul. 28, 2022

(65) Prior Publication Data

US 2023/0036309 A1 Feb. 2, 2023

(30) Foreign Application Priority Data

Jul. 29, 2021 (JP) ................................ 2021-124399

(51) Int. Cl.
*F25B 17/02* (2006.01)

(52) U.S. Cl.
CPC .................................. *F25B 17/02* (2013.01)

(58) Field of Classification Search
CPC ...................................................... F25B 17/02
See application file for complete search history.

(56) References Cited

U.S. PATENT DOCUMENTS 5,259,202 A * 11/1993 Nishiguchi ............ F25B 15/06
62/476

FOREIGN PATENT DOCUMENTS

JP H06294556 A * 10/1994
JP H06347126 A * 12/1994
JP H0828998 A * 2/1996
JP 2003-4330 A 1/2003
KR 101809963 B1 * 1/2018

OTHER PUBLICATIONS

Inoue, Absorption Freezer, Dec. 20, 1994, JPH06347126A, Whole Document (Year: 1994).*
Satou et al., Absorption Type Air Conditioner, Feb. 2, 1996, JPH0828998A, Whole Document (Year: 1996).*
Nishiguchi et al., Air Conditioning System Using Absorption Water Cooling/Heating Apparatus, Oct. 21, 1994, JPH06294556A, Whole Document (Year: 1994).*
Cho, Absorption Chiller, Jan. 18, 2018, KR101809963B1, Whole Document (Year: 2018).*

* cited by examiner

*Primary Examiner* — Larry L Furdge
(74) *Attorney, Agent, or Firm* — KENEALY VAIDYA LLP

(57) ABSTRACT

There is provided an absorption chiller including: a control unit configured to control opening and closing of the first control valve and an operation of the first pump, and a second supply flow path configured to supply the liquid inside the evaporator into the absorber; a second control valve opening and closing the second supply flow path; and a second pump configured to generate power to supply the liquid inside the evaporator into the absorber. After an operation of the absorption chiller is stopped, the control unit is configured to open the first control valve and operate the first pump such that a liquid inside the evaporator is mixed with the absorption liquid. Further, before the first control valve is opened and the first pump is operated, the control unit is configured to open the second control valve and operate the second pump.

5 Claims, 4 Drawing Sheets

ABSORPTION CHILLER

CROSS-REFERENCE TO RELATED APPLICATIONS

This application is based on and claims priority under 35 USC 119 from Japanese Patent Application No. 2021-124399 filed on Jul. 29, 2021, the contents of which are incorporated herein by reference.

TECHNICAL FIELD

The present disclosure relates to an absorption chiller.

BACKGROUND ART

In the related art, there is an absorption chiller that supplies an absorption liquid to an evaporator during operation (see JP2003-004330A). According to this absorption chiller, by supplying the absorption liquid having a freezing point lower than that of a refrigerant (for example, water) to the evaporator, a possibility of freezing in the evaporator is reduced, the evaporator is controlled at a lower temperature, and, for example, the absorption chiller can operate at a minus temperature.

The absorption chiller disclosed in JP2003-004330A supplies the absorption liquid to the evaporator during the operation. Here, inventors of the present disclosure study to prevent freezing during a long period of stop by mixing the refrigerant with the absorption liquid while the operation of the absorption chiller is stopped.

However, when the absorption chiller is operated in a state in which the refrigerant and the absorption liquid are mixed in the evaporator, a refrigeration capacity decreases. Therefore, it is necessary to discharge the absorption liquid at the time of restart from the long period of stop of the absorption chiller, and if the time required for this discharge is long, a large amount of time is required at the time of restart.

SUMMARY OF INVENTION

The present disclosure provides an absorption chiller capable of preventing freezing during a long period of stop and replacing an absorption liquid with a refrigerant in a shorter period of time at the time of restart.

According to an illustrative aspect of the present disclosure, an absorption chiller includes: a refrigeration cycle unit including a regenerator, a condenser, an evaporator, and an absorber; a first supply flow path configured to supply an absorption liquid inside the absorber into the evaporator; a first control valve opening and closing the first supply flow path; a first pump configured to generate power to supply the absorption liquid inside the absorber into the evaporator; a control unit configured to control opening and closing of the first control valve and an operation of the first pump, the control unit being configured to open the first control valve and operate the first pump such that a liquid inside the evaporator is mixed with the absorption liquid, after an operation of the absorption chiller is stopped, and a second supply flow path configured to supply the liquid inside the evaporator into the absorber; a second control valve opening and closing the second supply flow path; and a second pump configured to generate power to supply the liquid inside the evaporator into the absorber. The control unit is configured to open the second control valve and operate the second pump, after the operation of the absorption chiller is stopped and before the first control valve is opened and the first pump is operated.

DESCRIPTION OF EMBODIMENTS

Hereinafter, the present invention will be described in accordance with a preferred embodiment. The present invention is not limited to the following embodiment, and can be modified as appropriate without departing from the scope of the present invention. In the embodiment described below, some configurations are not illustrated or described, but it goes without saying that a known or well-known technique is applied as appropriate to details of an omitted technique within a range in which no contradiction occurs to contents described below.

Figure 1:
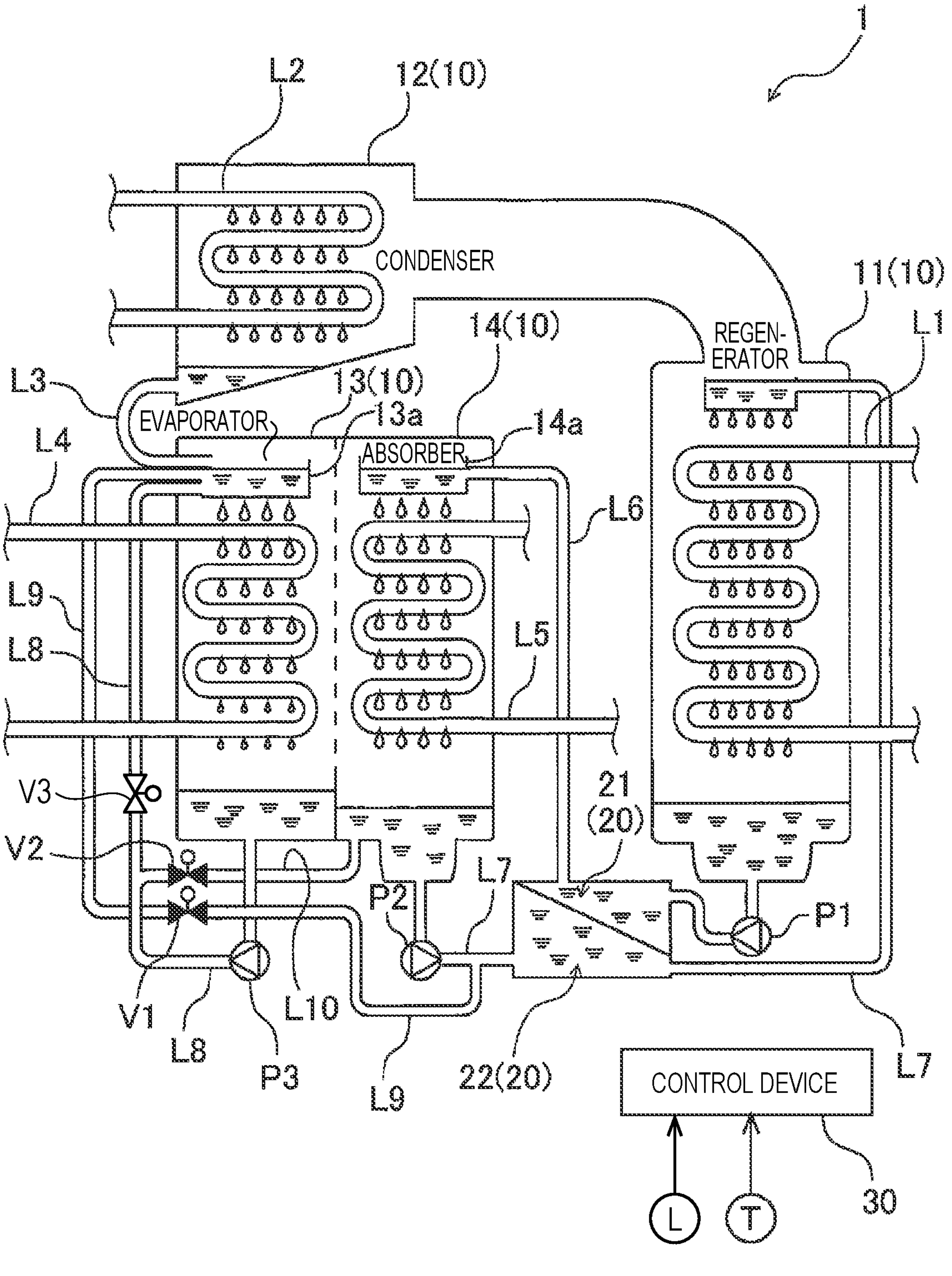
FIG. 1 is a configuration diagram illustrating an absorption chiller according to the present embodiment.

FIG. 1 is a configuration diagram illustrating an absorption chiller according to the present embodiment. As illustrated in FIG. 1, an absorption chiller 1 includes a refrigeration cycle unit 10, various pipes L1 to L8, pumps P1 to P3, a heat exchanger 20, a control device (control unit which may be referred to as a controller) 30, and an outside air temperature sensor T that measures an outside air temperature.

The refrigeration cycle unit 10 includes a regenerator 11, a condenser 12, an evaporator 13, and an absorber 14. The absorption chiller 1 obtains cold water by a refrigeration cycle of the regenerator 11, the condenser 12, the evaporator 13, and the absorber 14.

The regenerator 11 heats, for example, a dilute solution (a solution with a low concentration of an absorption liquid) obtained by mixing water serving as a refrigerant (hereinafter, a vaporized refrigerant is referred to as a vapor refrigerant, and a liquefied refrigerant is referred to as a liquid refrigerant) with a lithium bromide (LiBr) serving as the absorption liquid. In the present embodiment, the heat medium pipe L1 through which a high-temperature heat medium flows is inserted into the regenerator 11. The regenerator 11 heats the dilute solution by using the high-temperature heat medium flowing through the heat medium pipe L1. By this heating, the dilute solution is separated into a concentrated solution and the vapor refrigerant. The concentrated solution is accumulated in a lower portion of the regenerator 11, and the vapor refrigerant is supplied to the condenser 12 connected to the regenerator 11.

The condenser 12 liquefies the vapor refrigerant supplied from the regenerator 11. The first cooling water pipe L2 is inserted into the condenser 12. Cooling water from a cooling tower (not illustrated) flows into the first cooling water pipe L2 by using a cooling water pump (not illustrated) as power. Therefore, the vapor refrigerant obtained by the evaporation in the regenerator 11 is cooled and liquefied by the cooling water in the first cooling water pipe L2. Further, the liquid refrigerant liquefied by the condenser 12 is supplied to the evaporator 13 through the refrigerant pipe L3.

The evaporator 13 evaporates the liquid refrigerant. The evaporator 13 is provided with the cold water pipe L4 connected to an external device such as an indoor unit, and a refrigerant distributor 13*a* receiving the liquid refrigerant from the condenser 12. The cold water pipe L4 is connected to, for example, the indoor unit, and cold water from the indoor unit flows therein. Further, an inside of the evaporator 13 is in a vacuum state. Therefore, an evaporation temperature of water as the liquid refrigerant is about 5° C. or the like. Therefore, the liquid refrigerant sprayed on the cold water pipe L4 by the refrigerant distributor 13*a* is evaporated by a temperature of the cold water pipe L4. Further, a temperature of the cold water in the cold water pipe L4 is lowered by the evaporation of the liquid refrigerant. Accordingly, the cold water in the cold water pipe L4 is supplied to the indoor unit in a state where the temperature thereof is lowered, and the indoor unit supplies cold air into a room by using the cold water.

The absorber 14 absorbs the refrigerant (vapor refrigerant) evaporated in the evaporator 13. A concentrated solution distributor 14*a* receiving the concentrated solution from the regenerator 11 is provided in the absorber 14. The concentrated solution is sprayed from the concentrated solution distributor 14*a* into the absorber 14. Accordingly, the vapor refrigerant obtained by the evaporation in the evaporator 13 is absorbed by the sprayed concentrated solution, and a dilute solution is generated. The second cooling water pipe L5 is inserted into the absorber 14. The cooling water from the cooling tower (not illustrated) flows in the second cooling water pipe L5 by using the cooling water pump (not illustrated) as power, and absorption heat generated by the absorption of the refrigerant in the concentrated solution is removed by the cooling water in the second cooling water pipe L5. An outlet side of the second cooling water pipe L5 is connected to an inlet side of the first cooling water pipe L2.

The lower portion of the regenerator 11 is connected to an upper portion of the absorber 14 through a concentrated solution pipe L6 and a concentrated solution reservoir 21 of the heat exchanger 20. The concentrated solution in the lower portion of the regenerator 11 is pumped up with pressure to the upper portion of the absorber 14 by power of the concentrated solution pump P1. A lower portion of the absorber 14 is connected to an upper portion of the regenerator 11 through the dilute solution pipe L7 and a dilute solution storage portion 22 of the heat exchanger 20. The dilute solution in the lower portion of the absorber 14 is pumped up with pressure to the upper portion of the regenerator 11 by power of the dilute solution pump (first pump) P2.

The concentrated solution from the regenerator 11 and the dilute solution from the absorber 14 are introduced into the heat exchanger 20, and heat is exchanged. That is, the concentrated solution from the regenerator 11 is supplied to the upper portion of the absorber 14 in a state where the temperature thereof is lowered by heating the dilute solution. On the other hand, the dilute solution from the absorber 14 receives heat from the concentrated solution, rises in temperature, and is then supplied to the upper portion of the regenerator 11.

Further, the evaporator 13 is provided with the circulation pipe (circulation flow path) L8 that connects a lower portion and an upper portion of the evaporator 13 (in other words, the circulation pipe L8 connects at least two parts of the evaporator 13 to one another). A refrigerant pump (second pump) P3 is provided on the circulation pipe L8. Therefore, the liquid refrigerant in the lower portion of the evaporator 13 is supplied to the refrigerant distributor 13*a* through the circulation pipe L8 by the power of the refrigerant pump P3. Therefore, the liquid refrigerant that does not contribute to evaporation in the evaporator 13 is sprayed again from the refrigerant distributor 13*a*.

The control device 30 controls the entire absorption chiller 1, and controls, for example, operations of the pumps P1 to P3, introduction of the heat medium into the regenerator 11, and the like. The outside air temperature sensor T outputs a signal corresponding to an outside air temperature to the control device 30. The control device 30 determines the outside air temperature based on the signal from the outside air temperature sensor T. Further, the control device 30 has a timer function as illustrated in a flowchart to be described later.

Further, the absorption chiller 1 according to the present embodiment includes a first branch pipe (first supply flow path) L9 and a solution switching valve (first control valve) V1. The first branch pipe L9 is a pipe of which one end is connected to the dilute solution pipe L7 between the dilute solution pump P2 and the heat exchanger 20 and the other end is connected to the refrigerant distributor 13*a*. The solution switching valve V1 is provided on the first branch pipe L9 to open and close the flow path.

In the present embodiment, the control device 30 performs control to feed the absorption liquid in the absorber 14 into the evaporator 13 in order to prevent freezing of the liquid refrigerant when the absorption chiller 1 is stopped for a long period of time in winter and the like. That is, the control device 30 opens the solution switching valve V1 and operates the dilute solution pump P2. At this time, the control device 30 also operates the concentrated solution pump P1. Accordingly, the control device 30 feeds a part of the absorption liquid into the evaporator 13 while circulating the absorption liquid between the regenerator 11 and the absorber 14.

Here, the absorption liquid has a freezing point lower than that of the liquid refrigerant. Therefore, by feeding the absorption liquid in the absorber 14 into the evaporator 13 and mixing the absorption liquid with the liquid refrigerant, the freezing point of the liquid is lowered, and the refrigerant can be prevented from freezing during a long period of stop in winter and the like.

However, when the absorption liquid in the absorber 14 is fed into the evaporator 13 to prevent freezing, it is necessary to discharge the absorption liquid from the viewpoint of absorption refrigeration efficiency at the time of restart of the absorption chiller 1, and it will take a long time to restart if the time required for this discharge is long.

Therefore, the absorption chiller 1 according to the present embodiment includes a second branch pipe (second supply flow path) L10 and a refrigerant switching valve (second control valve) V2. The second branch pipe L10 is a pipe of which one end is connected to a downstream side from the refrigerant pump P3 among the circulation pipe L8 and the other end is connected to the lower portion of the absorber 14. The other end of the second branch pipe L10 is not limited to being connected to the lower portion of the absorber 14, and may be connected to the upper portion of the absorber 14. The refrigerant switching valve V2 is provided on the second branch pipe L10 to open and close the flow path.

In the present embodiment, the control device 30 performs control to feed the liquid refrigerant in the evaporator 13 into the absorber 14 before performing control to feed the absorption liquid in the absorber 14 into the evaporator 13 in order to prevent freezing of the liquid refrigerant. That is, the control device 30 opens the refrigerant switching valve V2 and operates the refrigerant pump P3. Accordingly, an amount of the liquid refrigerant in the evaporator 13 is reduced before the absorption liquid is fed into the evaporator 13. As a result, an amount of the absorption liquid fed into the evaporator 13 may also be reduced, and the time required for discharging the absorption liquid in the evaporator 13 is also shortened.

Figure 2:
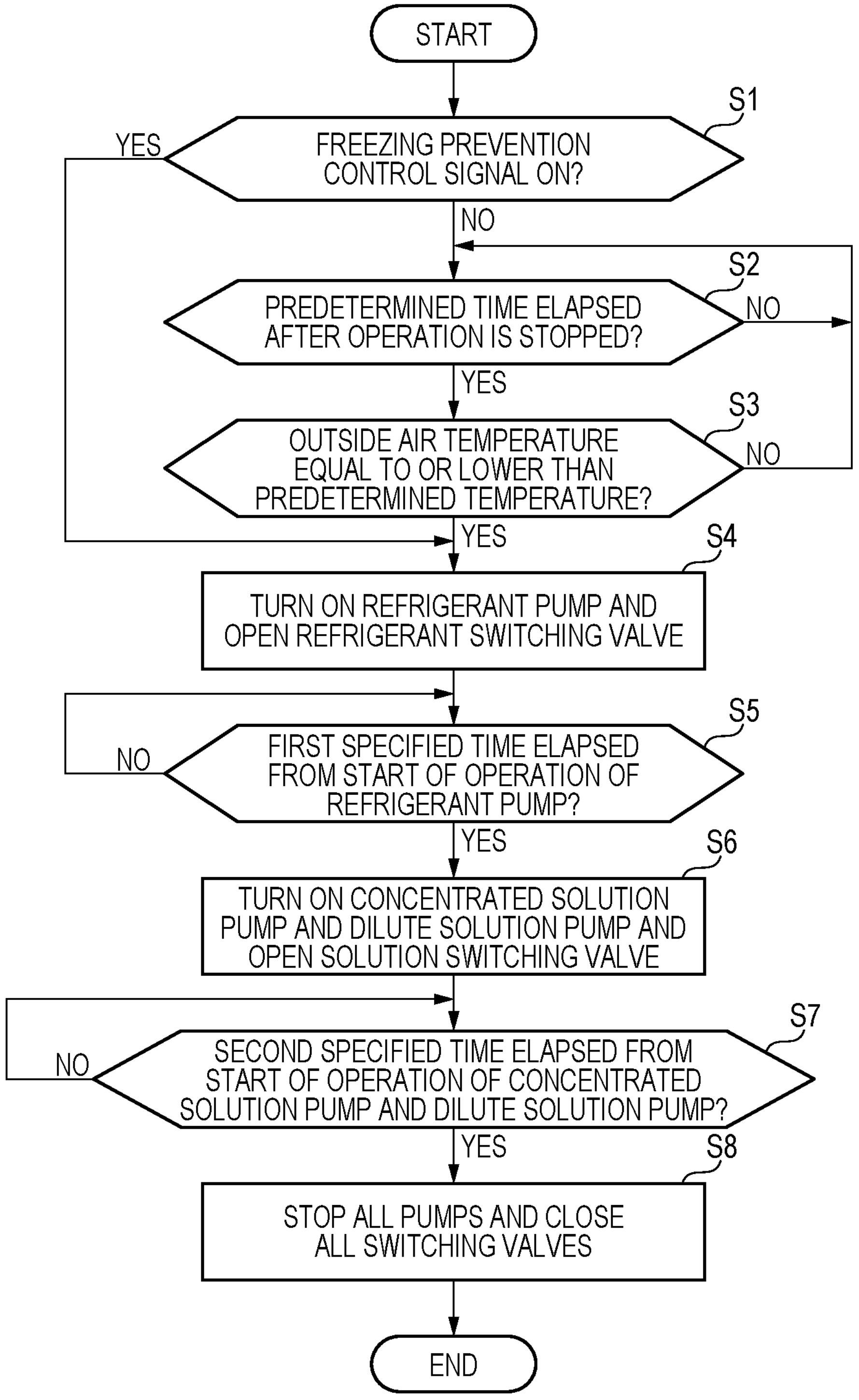
FIG. 2 is a flowchart illustrating an operation of the absorption chiller according to the present embodiment.
Figure 3:
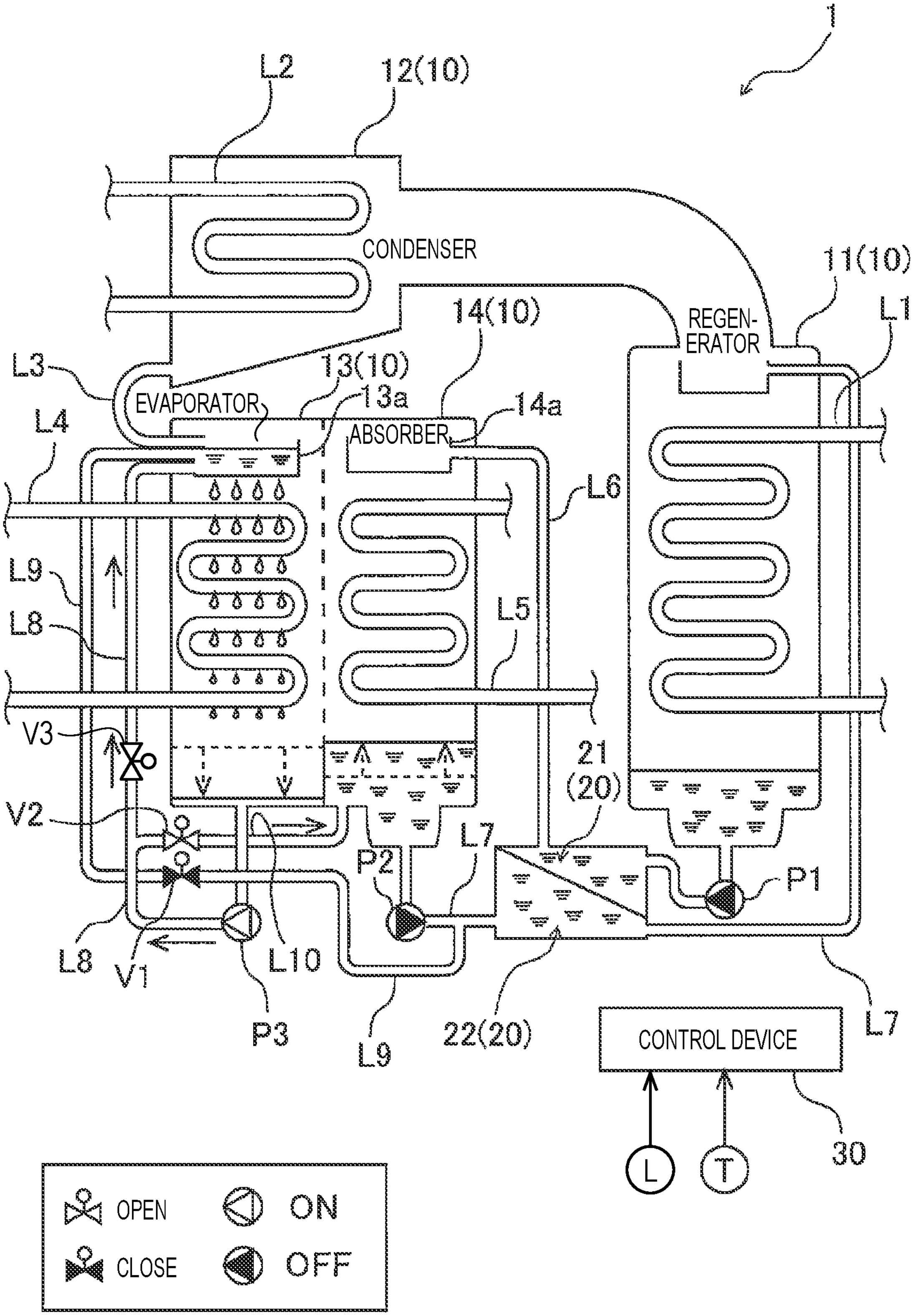
FIG. 3 is a state diagram illustrating a state of a first stage of a freezing prevention operation of the absorption chiller according to the present embodiment.
Figure 4:
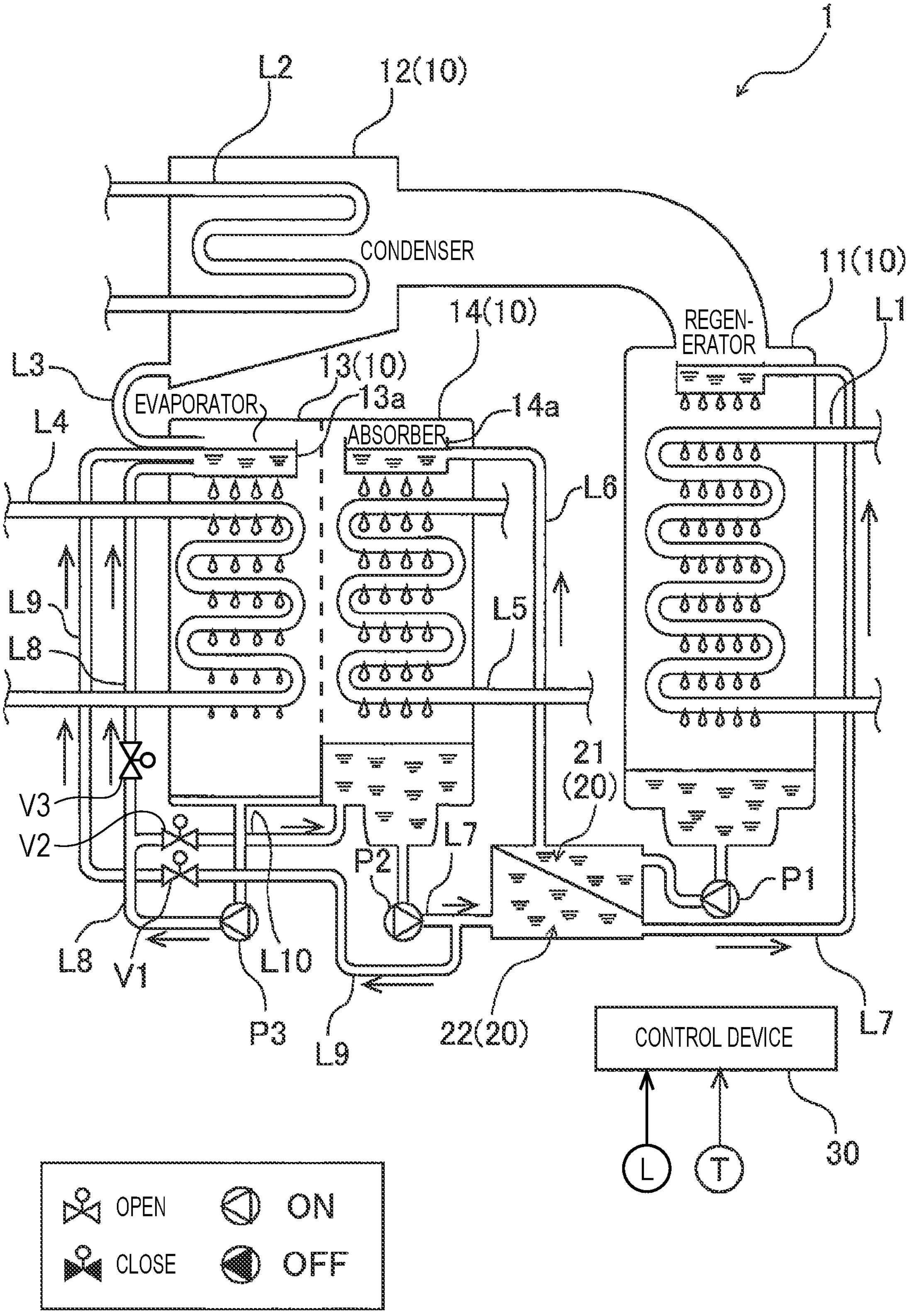
FIG. 4 is a state diagram illustrating a state of a second stage of the freezing prevention operation of the absorption chiller according to the present embodiment.

FIG. 2 is a flowchart illustrating an operation of the absorption chiller 1 according to the present embodiment. FIGS. 3 and 4 are state diagrams illustrating states of a first stage and a second stage of a freezing prevention operation of the absorption chiller 1 according to the present embodiment, respectively.

After the operation is stopped, the control device 30 executes processing illustrated in FIG. 2. That is, first, the control device 30 determines whether a freezing prevention control signal is ON (S1). The freezing prevention control signal is determined to be ON, for example, when a user, an operator, or the like sets in advance that freezing prevention control is to be performed at the time of stopping, or when an instruction to perform the freezing prevention control is given through an operation of the user, the operator, or the like.

When the freezing prevention control signal is ON (S1: YES), the processing proceeds to step S4. When the freezing prevention control signal is not ON (S1: NO), the control device 30 determines whether a predetermined time has elapsed after the operation of the absorption chiller 1 is stopped (S2). When the predetermined time has not elapsed (S2: NO), this processing is repeated until it is determined that the predetermined time has elapsed.

When the predetermined time has elapsed (S2: YES), the control device 30 determines whether the outside air temperature is equal to or lower than a predetermined temperature based on the signal from the outside air temperature sensor T (S3). When the outside air temperature is not equal to or lower than the predetermined temperature (S3: NO), the processing proceeds to step S2.

On the other hand, when the outside air temperature is equal to or lower than the predetermined temperature (S3: YES), as illustrated in FIG. 3, the control device 30 turns on the refrigerant pump P3 and opens the refrigerant switching valve V2 (S4). Accordingly, as illustrated in FIG. 3, firstly, the liquid refrigerant in the evaporator 13 is transferred into the absorber 14, and a water level is lowered.

FIG. 2 is referred to again. After the control device 30 turns on the refrigerant pump P3 and opens the refrigerant switching valve V2 (after S4), the control device 30 determines whether a first specified time has elapsed from the start of the operation of the refrigerant pump P3 (S5). When the first specified time has not elapsed (S5: NO), this processing is repeated until it is determined that the first specified time has elapsed.

On the other hand, when the first specified time has elapsed (S5: YES), as illustrated in FIG. 4, the control device 30 turns on the concentrated solution pump P1 and the dilute solution pump P2, and opens the solution switching valve V1 (S6). Accordingly, the control device 30 feeds the absorption liquid in the absorber 14 into the evaporator 13, thereby preventing freezing. Even in a process in which the absorption liquid is fed into the evaporator 13, the refrigerant pump P3 is ON and the refrigerant switching valve V2 is in an open state, so that an amount of liquid in the evaporator 13 is maintained to be relatively small.

Thereafter, the control device 30 determines whether a second specified time has elapsed from the start of the operation of the concentrated solution pump P1 and the dilute solution pump P2 (S7). When the second specified time has not elapsed (S7: NO), this processing is repeated until it is determined that the second specified time has elapsed.

On the other hand, when the second specified time has elapsed (S7: YES), the control device 30 stops all the pumps P1 to P3 and closes all the switching valves V1 and V2 (S8). Then, the processing illustrated in FIG. 2 ends.

In this manner, according to the absorption chiller 1 of the present embodiment, the liquid refrigerant in the evaporator 13 is mixed with the absorption liquid by opening the solution switching valve V1 and operating the dilute solution pump P2 (and the concentrated solution pump P1) after the operation is stopped. Therefore, the liquid refrigerant and the absorption liquid are mixed to lower the freezing point of the liquid, and the liquid in the evaporator 13 is less likely to freeze. Further, since the refrigerant switching valve V2 is opened and the refrigerant pump P3 is operated before the solution switching valve V1 is opened and the dilute solution pump P2 is operated after the operation is stopped, an amount of the refrigerant in the evaporator 13 is first reduced. As a result, it is possible to reduce an amount of the absorption liquid mixed with the liquid refrigerant in the evaporator 13, it is only necessary to replace a small amount of a mixed liquid in the evaporator 13 with the liquid refrigerant at the time of the restart, and the time required for the restart can be shortened. Therefore, freezing during a long period of stop can be prevented and the small amount of the mixed liquid can be replaced with the liquid refrigerant in a shorter period of time at the time of restart.

The present invention has been described based on the embodiment, but the present invention is not limited to the embodiment described above and can be appropriately modified without departing from the spirit of the present invention, and other technologies may be appropriately combined within a possible range. Further, known or well-known techniques may be combined within a possible range.

For example, in the embodiment described above, a separate control valve V3 may be provided at a position on a downstream side of a portion of the circulation pipe L8 to which the second branch pipe L10 is connected (for example, a position on an upper side than the connected portion of the circulation pipe L8), and the control valve may be closed in the processing of step S4 illustrated in FIG. 2.

By closing the separate control valve V3 while the refrigerant switching valve V2 is opened and the refrigerant pump P3 is operated, it is possible to smoothly transfer the liquid refrigerant from the evaporator to the absorber.

Further, a water level sensor L (in other words, a level sensor L that detects a level of a liquid inside the evaporator 13) may be provided in the evaporator 13, and when a water level becomes equal to or lower than a predetermined water level in the processing of step S5 illustrated in FIG. 2, the processing may proceed to the processing of step S6 illustrated in FIG. 2.

Further, based on the signal from the outside air temperature sensor T, the water level detected by the water level sensor L may be controlled to be lower as the outside air temperature becomes lower. That is, the first specified time in step S5 may be set to be longer as the outside air temperature becomes lower.

In the present embodiment, the regenerator 11 heats the dilute solution with a heating medium. However, the present invention is not limited thereto, and the regenerator 11 may heat the dilute solution by a gas burner using a combustible gas as a fuel or a pellet burner using wood pellets as a fuel, or may heat the dilute solution by using a high-temperature exhaust gas or the like.

Further, although the absorption chiller 1 according to the present embodiment includes the heat exchanger 20 that exchanges heat between the dilute solution and the concentrated solution, the present invention is not particularly limited thereto, and the absorption chiller 1 may not include the heat exchanger 20.

In addition, in the present embodiment, the absorption chiller 1 that supplies cold water to the indoor unit or the like has been described as an example, but the present invention is not particularly limited thereto, and the present invention may be applied to an absorption chiller and heater that can supply hot water to the indoor unit or the like.

According to a first aspect of the present disclosure, an absorption chiller (1) includes: a refrigeration cycle unit (10) including a regenerator (11), a condenser (12), an evaporator (13), and an absorber (14); a first supply flow path (L9) configured to supply an absorption liquid inside the absorber (14) into the evaporator (13); a first control valve (V1) opening and closing the first supply flow path (L9); a first pump (P2) configured to generate power to supply the absorption liquid inside the absorber (14) into the evaporator (13); a control unit (30) configured to control opening and closing of the first control valve (V1) and an operation of the first pump (P2), the control unit (30) being configured to open the first control valve (V1) and operate the first pump (P2) such that a liquid inside the evaporator (13) is mixed with the absorption liquid, after an operation of the absorption chiller (1) is stopped, and a second supply flow path (L10) configured to supply the liquid inside the evaporator (13) into the absorber (14); a second control valve (V2) opening and closing the second supply flow path (L10); and a second pump (P3) configured to generate power to supply the liquid inside the evaporator (13) into the absorber (14). The control unit (30) is configured to open the second control valve (V2) and operate the second pump (P3), after the operation of the absorption chiller (1) is stopped and before the first control valve (V1) is opened and the first pump (P2) is operated.

According to a second aspect of the present disclosure, the absorption chiller (1) may further include: a circulation flow path (L8) connecting at least two parts of the evaporator (13) to one another. One end of the second supply flow path (L10) may be connected to a downstream side from the second pump (P3) among the circulation flow path (L8), and the other end of the second supply flow path (L10) may be connected to the absorber (14).

According to a third aspect of the present disclosure, the absorption chiller (1) may further include: a third control valve (V3) provided at a position on the downstream side than a portion of the circulation flow path (L8) to which the second supply flow path (L10) is connected. The control unit (30) is configured to close the third valve (V3) while opening the second control valve (V2) and operating the second pump (P3).

According to a fourth aspect of the present disclosure, the absorption chiller (1) may further include: an outside air temperature sensor (T) that measures an outside air temperature. After the operation of the absorption chiller (1) is stopped, when the outside air temperature is equal to or lower than a predetermined temperature based on a signal from the outside air temperature sensor (T), the control unit (30) may be configured to open the second control valve (V2) and operate the second pump (P3).

According to a fifth aspect of the present disclosure, the absorption chiller (1) may further include: a level sensor (L) that detects a level of the liquid inside the evaporator (13). When the level of the liquid is equal to or lower than a predetermined level of the liquid, the control unit (30) may be configured to open the first control valve (V1) and operate the first pump (P2).

According to the first to fifth aspects of the present disclosure, since the first control valve is opened and the first pump is operated after the operation is stopped to mix the refrigerant in the evaporator with the absorption liquid, the refrigerant and the absorption liquid are mixed to lower a freezing point is lowered by mixing the refrigerant and the absorption liquid, and the liquid in the evaporator is less likely to freeze. Further, since the second control valve is opened and the second pump is operated before the first control valve is opened and the first pump is operated after the operation is stopped, an amount of the refrigerant in the evaporator is first reduced. As a result, it is possible to reduce an amount of the absorption liquid mixed with the refrigerant in the evaporator, it is only necessary to discharge the absorption liquid from a relatively small amount of the mixed liquid in the evaporator at the time of the restart, and time required for the restart can be shortened. Therefore, freezing during a long period of stop can be prevented, and the absorption liquid can be replaced with the refrigerant in a shorter period of time at the time of restart.

What is claimed is:

1. An absorption chiller comprising:

a refrigeration cycle unit including a regenerator, a condenser, an evaporator, an absorber;

a first supply flow path configured to supply an absorption liquid inside the absorber into the evaporator;

a first control valve opening and closing the first supply flow path;

a first pump configured to generate power to supply the absorption liquid inside the absorber into the evaporator;

a control unit configured to control opening and closing of the first control valve and an operation of the first pump, the control unit being configured to open the first control valve and operate the first pump for a specified time such that a liquid inside the evaporator is mixed with the absorption liquid supplied from the absorber and into the evaporator, after an operation of the absorption chiller is stopped, and a second supply flow path configured to supply the liquid inside the evaporator into the absorber;

a second control valve opening and closing the second supply flow path; and a second pump configured to generate power to supply the liquid inside the evaporator into the absorber, wherein the control unit is configured to open the second control valve and operate the second pump, after the operation of the absorption chiller is stopped and before the first control valve is opened and the first pump is operated.

2. The absorption chiller according to claim 1, further comprising:

a circulation flow path connecting at least two parts of the evaporator to one another, wherein one end of the second supply flow path is connected downstream from the second pump among the circulation flow path, and the other end of the second supply flow path is connected to the absorber.

3. The absorption chiller according to claim 2, further comprising:

a third control valve provided at a position downstream of a portion of the circulation flow path to which the second supply flow path is connected, wherein the control unit is configured to close the third control valve while opening the second control valve and operating the second pump.

4. The absorption chiller according to claim 1, further comprising:

an outside air temperature sensor that measures an outside air temperature, wherein after the operation of the absorption chiller is stopped, when the outside air temperature is equal to or lower than a predetermined temperature based on a signal from the outside air temperature sensor, the control unit is configured to open the second control valve and operate the second pump.

5. The absorption chiller according to claim 1, further comprising:

a level sensor that detects a level of the liquid inside the evaporator, wherein when the level of the liquid is equal to or lower than a predetermined level of the liquid, the control unit is configured to open the first control valve and operate the first pump.

* * * * *